United States Patent
Candelore et al.

(10) Patent No.: US 6,694,396 B1
(45) Date of Patent: Feb. 17, 2004

(54) INTERFACING AN NRSS-A SMART CARD WITHIN AN NRSS-B PCMCIA

(75) Inventors: Brant L. Candelore, Escondido, CA (US); David A. Desch, Poway, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 420 days.

(21) Appl. No.: 09/585,295

(22) Filed: Jun. 2, 2000

Related U.S. Application Data

(60) Provisional application No. 60/140,292, filed on Jun. 18, 1999.

(51) Int. Cl.[7] .................................................. G06F 13/00
(52) U.S. Cl. ........................... 710/102; 710/13; 710/33; 710/74; 712/225; 370/509
(58) Field of Search .............................. 710/1, 5, 8, 62, 710/13, 31, 39, 43, 65, 72–74, 100–103, 129, 17, 30, 33, 36; 370/509, 390; 361/737; 439/325; 712/225

(56) References Cited

U.S. PATENT DOCUMENTS

| | | | |
|---|---|---|---|
| 5,599,203 A | * | 2/1997 | Broschard, III ............. 439/489 |
| 5,666,293 A | | 9/1997 | Metz et al. |
| 5,667,408 A | * | 9/1997 | Broschard, III et al. .... 439/630 |
| 5,724,510 A | * | 3/1998 | Arndt et al. ................. 709/245 |
| 5,768,539 A | * | 6/1998 | Metze et al. ................ 709/245 |
| 5,826,166 A | | 10/1998 | Brooks et al. |
| 5,915,020 A | * | 6/1999 | Tilford et al. ................. 380/10 |
| 5,978,855 A | * | 11/1999 | Metz et al. .................. 709/249 |
| 6,122,175 A | * | 9/2000 | Shieh .......................... 361/737 |
| 6,149,450 A | * | 11/2000 | Gastineau .................... 439/325 |
| 6,370,143 B1 | * | 4/2002 | Yamagishi ................... 370/390 |
| 6,396,850 B1 | * | 5/2002 | De Vito ....................... 370/509 |
| 6,457,641 B1 | * | 10/2002 | Reichardt ................... 235/441 |

OTHER PUBLICATIONS

International Search Report in connection with International Application No. PCT/US00/16196 dated Aug. 28, 2000 (6 pages).

* cited by examiner

*Primary Examiner*—Jeffrey Gaffin
*Assistant Examiner*—Rijue Mai
(74) *Attorney, Agent, or Firm*—Blakely, Sokoloff, Taylor & Zafman LLP

(57) ABSTRACT

An adapter having a slot, a connector, and a passive router that routes signals from a smart card inserted in the slot to the connector, is disclosed.

22 Claims, 8 Drawing Sheets

INTERFACING AN NRSS-A SMART CARD WITHIN AN NRSS-B PCMCIA

CROSS-REFERENCE TO RELATED APPLICATION

This application claims the benefit of the filing date of the Provisional U.S. Patent Application entitled "Method For Interfacing an NRSS-A Smart Card Within An NRSS-B 'PCMCIA' Slot", application No. 60/140,292, filed Jun. 18, 1999.

FIELD OF INVENTION

This invention is related to descrambling a transport stream. In particular, this invention is related to descrambling a transport stream using information from a smart card.

BACKGROUND OF THE INVENTION

The National Renewal Security System (NRSS) has defined two types of conditional access (CA) modules, an NRSS-A module (with a smart card form factor) and NRSS-B module (with a PCMCIA form factor). Not only are the form factors different for the part A and part B modules but also the protocols are different.

A television (TV), set top box, or cable box manufacturer may need to provide two types of NRSS slots for the CA module, one that has a smart card form factor, and one that has a PCMCIA form factor, and support the protocols for each. To support the two conditional access modules, a TV, set top box or cable box manufacturer currently needs to implement a separate NRSS-B PCMCIA form factor reader as well as a separate NRSS-A smart card form factor reader, as shown in FIGS. 1 and 2.

FIG. 1 shows an NRSS-B CA module 100 that receives smart card 110. A smart card interface 120 transmits signals from the smart card 110 to central processing unit (CPU) 130. The CPU 130 detects control words from the signals, and sends the control words to descrambler integrated circuit (IC) 140. The descrambler IC 140 receives a scrambled transport stream from host 150, descrambles the stream using the control words, and outputs a descrambled stream to copy protection module 160. Copy protection module 160 protects the descrambled stream and transmits the stream back to host 150. The copy protected descrambled stream may be a digitally formatted movie, for example.

FIG. 2 shows an NRSS-A smart card 200 that receives a scrambled transport stream from host device 210. The scrambled stream is received by descrambler IC 220. CPU 230 sends control words to descrambler IC. The descrambler IC 220 then uses the control words to descramble the transport stream and to output a descrambled stream to host 210. The stream is protected by copy protection module 240, and the descrambled copy protected transport stream is set from smart card 200 to host 210.

SUMMARY OF THE INVENTION

An adapter having a slot, a connector, and a passive router that routes signals from a smart card inserted in the slot to the connector, is disclosed.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

These and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than restrictive sense and the invention measured only in terms of the claims.

An apparatus that permits a single conditional access (CA) module to receive either an NRSS-A smart card or an NRSS-B PCMCIA card is disclosed. The CA module can use control words from the smart card or the PCMCIA card to descramble a transport stream. In one embodiment, the CA module has a slot to receive a card. The rear portion of the CA module has a PCMCIA connector to make an electrical connection with the card if the card is a PCMCIA card. The top portion of the CA module has a smart card reader to make an electrical connection with the card if the card is a smart card. In another embodiment, the CA module has a slot to receive a card. If the card is a PCMCIA card, it is inserted directly into the slot and makes an electrical connection with the CA module. If the card is a smart card, a smart card adapter is inserted into the slot, and the smart card is inserted into the adapter. The adapter routes the serial signals output by the smart card to the CA module. The CA module converts the serial stream to parallel, and processes the signals. The CA module converts its parallel signals to serial and sends them to the adapter, where the signals are routed to the smart card. In another embodiment, both the NRSS-A and B protocols are combined into one protocol, that supports both the PCMCIA cards and the smart cards.

An advantage of the apparatus that can receive both PCMCIA cards and smart cards is providing a single conditional access module that can communicate with both the PCMCIA cards and the smart cards. This reduces the costs involved in providing a conditional access module to a television set or a cable box. Furthermore, this greatly increases the flexibility to consumers deciding whether to use a PCMCIA card or a smart card. Thus, the apparatus combines the readers so that the CA module only takes up the space of a single PCMCIA-form factor reader.

In one embodiment, the PCMCIA housing can accommodate an NRSS-B PCMCIA form factor module, and with a plastic insert, a smart card form factor module. The plastic insert places the card towards the top (or bottom) of the slot so that it may make contact with the reader. The reader will make an electrical connection with the ISO contacts. When the PCMCIA is inserted, the fingers of the reader are pushed out of the way, in the housing.

Figure 1:
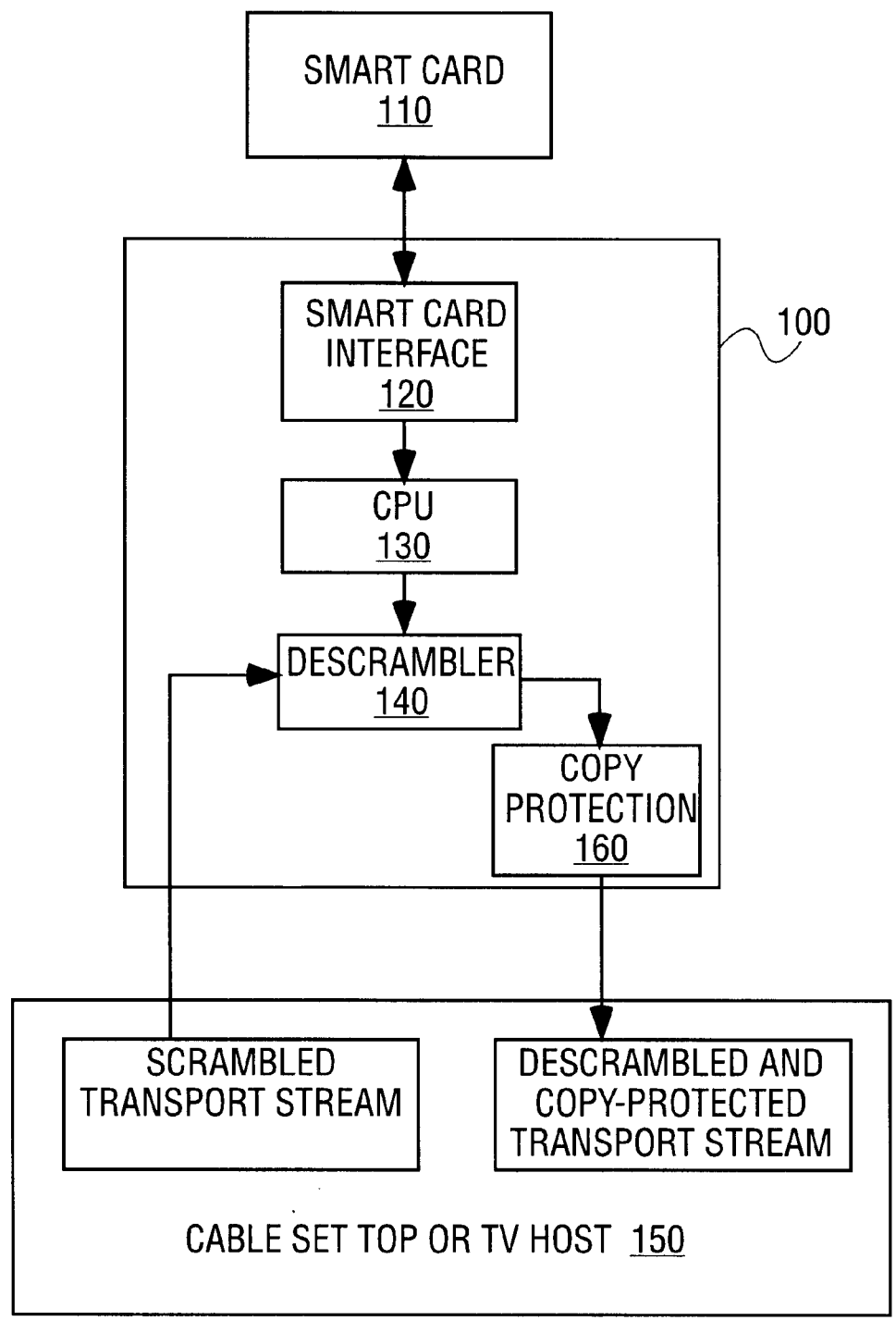
FIG. 1 is a prior art NRSS-B CA module.
Figure 2:
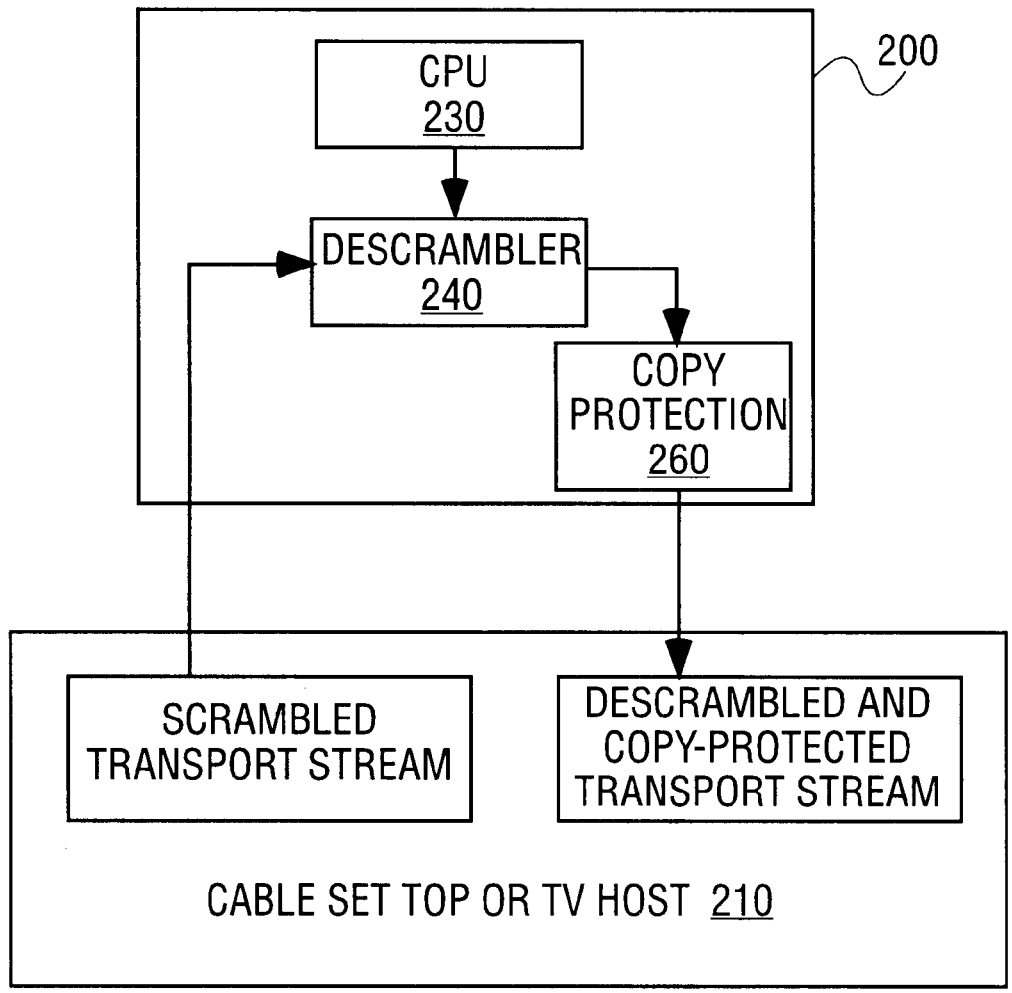
FIG. 2 is a prior art NRSS-A CA module.
Figure 3:
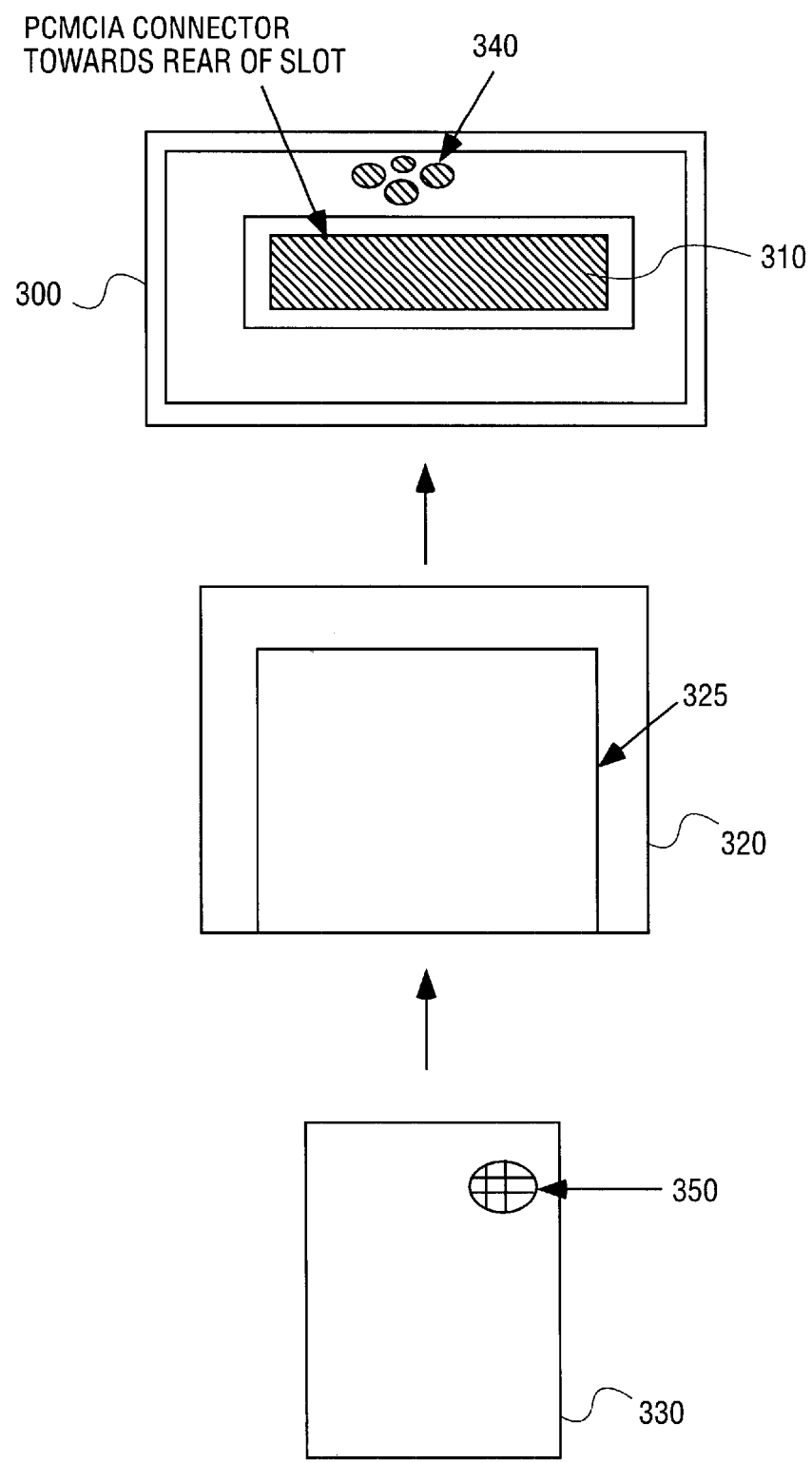
FIG. 3 is a PCMCIA Type 2 Slot with a smart card reader built in to the top or bottom of the housing.

FIG. 3 shows an embodiment of a PCMCIA housing for a PCMCIA form factor CA module that includes a smart card reader inside the housing, so that the single module can support both the NRSS-A and the NRSS-B protocols. In this embodiment, the housing 300 has a PCMCIA connector 305, so that the PCMCIA card inserted in opening 310 can make an NRSS-B connection with the CA module 300. Alternatively, a plastic insert 320 may be inserted into opening 310 along with an NRSS-A smart card 330. The plastic insert 320 includes a recessed space 325 to accommodate the NRSS-A smart card 330. The insert 320 places the smart card 330 toward the top of the slot so that the smart card makes contact with smart card reader 340. The reader 340 thus makes an electrical connection with the ISO contacts 350 on smart card 330.

Figure 4:
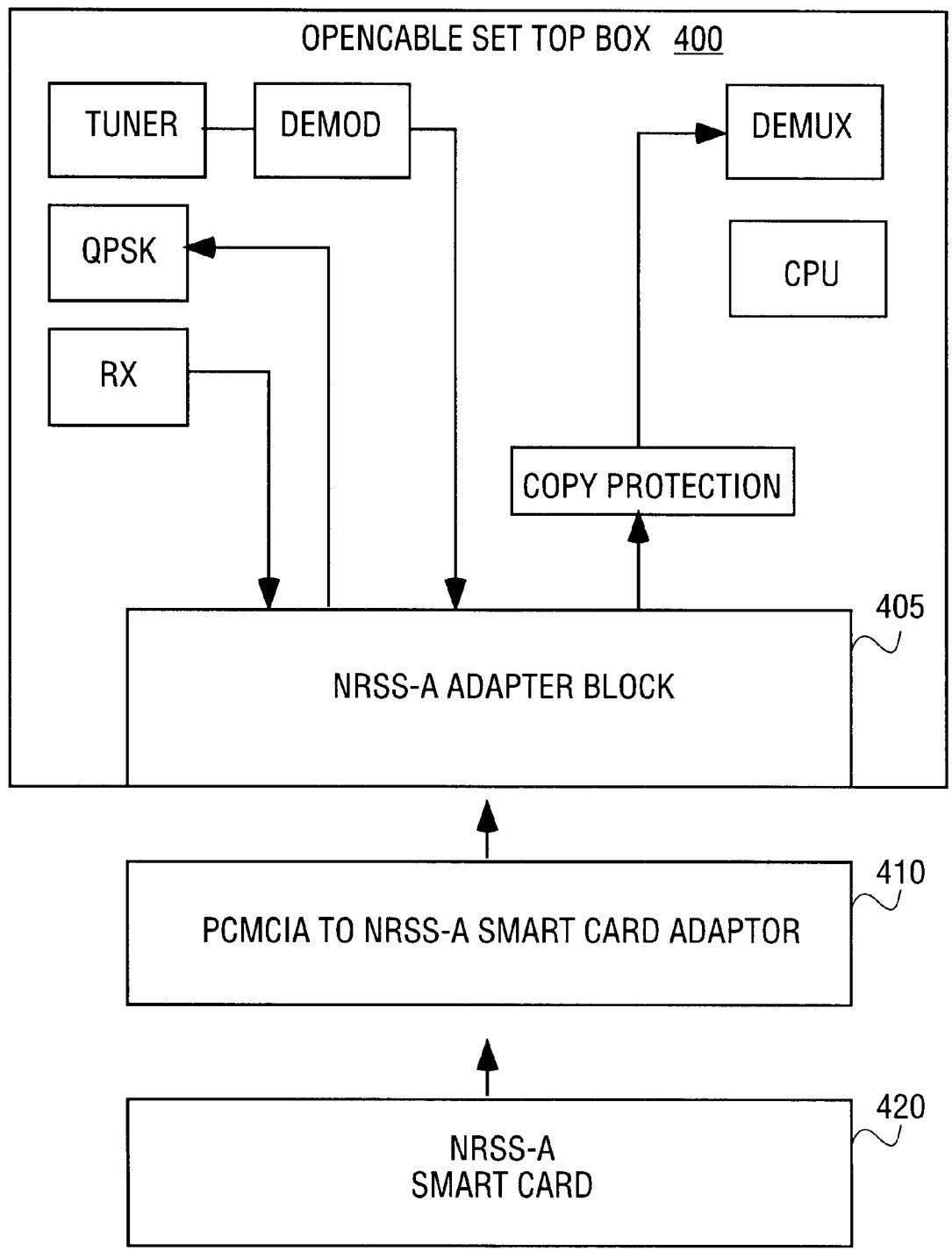
FIG. 4 is an NRSS-B CA modules, method that uses the OOB signals to send a serial stream to the smart card.

A smart card adapter can modify the signals to provide a PCMCIA interface. On the host side, the signals can be modified and re-routed, as shown in FIG. 4. The CA module of FIG. 4 can support both the NRSS-A and NRSS-B protocols. If the NRSS-B protocol is used, then an NRSS-B card is placed directly into the host device 400. However, if an NRSS-A smart card is used, then a PCMCIA to NRSS-A smart card adapter 410 is connected to host device 400 through adapter block 405. NRSS-A smart card 420 is then placed into adapter 410. The adapter 410 uses out of band (OOB) signals to send a serial transport stream to the smart card 420.

Figure 5:
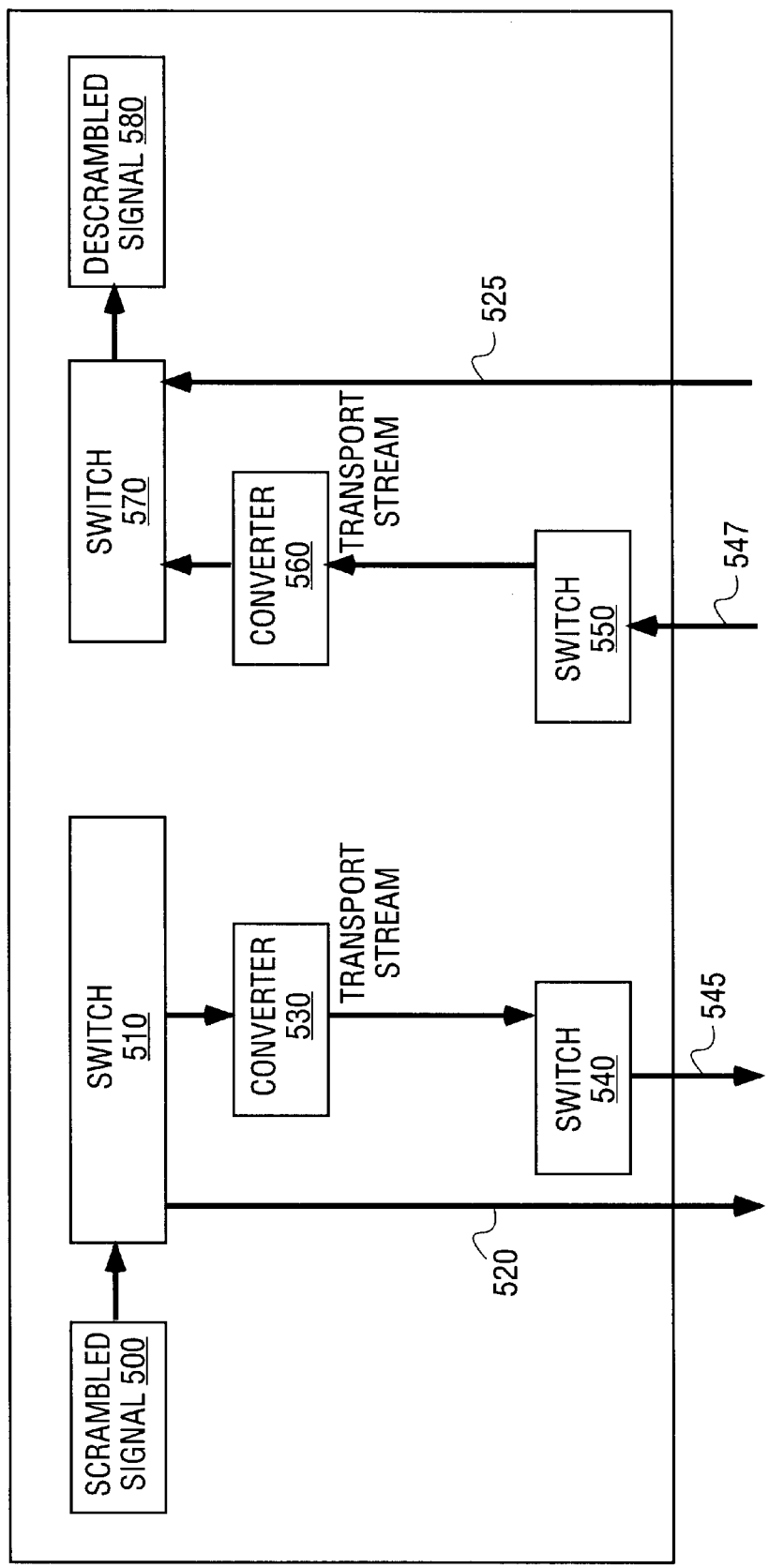
FIG. 5 is a CA module that uses OOB pins to communicate with the smart card.

FIG. 5 shows the OOB signals 500 and 510 that are sent to and received from the smart card by the host. The scrambled transport stream 500 is received by switch 510. If the card inserted into the host device is a PCMCIA card, then the scrambled stream is sent through the MDIO through 7 signals, which along with MCLKI signal, are sent in parallel to the PCMCIA card through parallel connection 520. The PCMCIA card descrambles the signal and transmits the descrambled parallel signal back to the host device through parallel connection 525.

However, if an adapter is inserted into the host device, then switch 510 sends the scrambled transport stream to parallel to serial converter 530, where the scrambled serial stream is converted into a serial stream. The scrambled serial transport stream is then sent to switch 540, then through an out of band pin 545 to adapter. The serial stream is then sent through the adapter to the smart card, where it is descrambled. The descrambled serial transport stream is then sent from the smart card, through the adapter, to OOB pin 547 to switch 550 in the host device. The switch 550 sends the stream to serial to parallel converter 560, where the descrambled serial stream is converted to a parallel signal, and send to switch 570. The descrambled signal 580 may then be displayed to a user or otherwise processed by the CA module.

Figure 6:
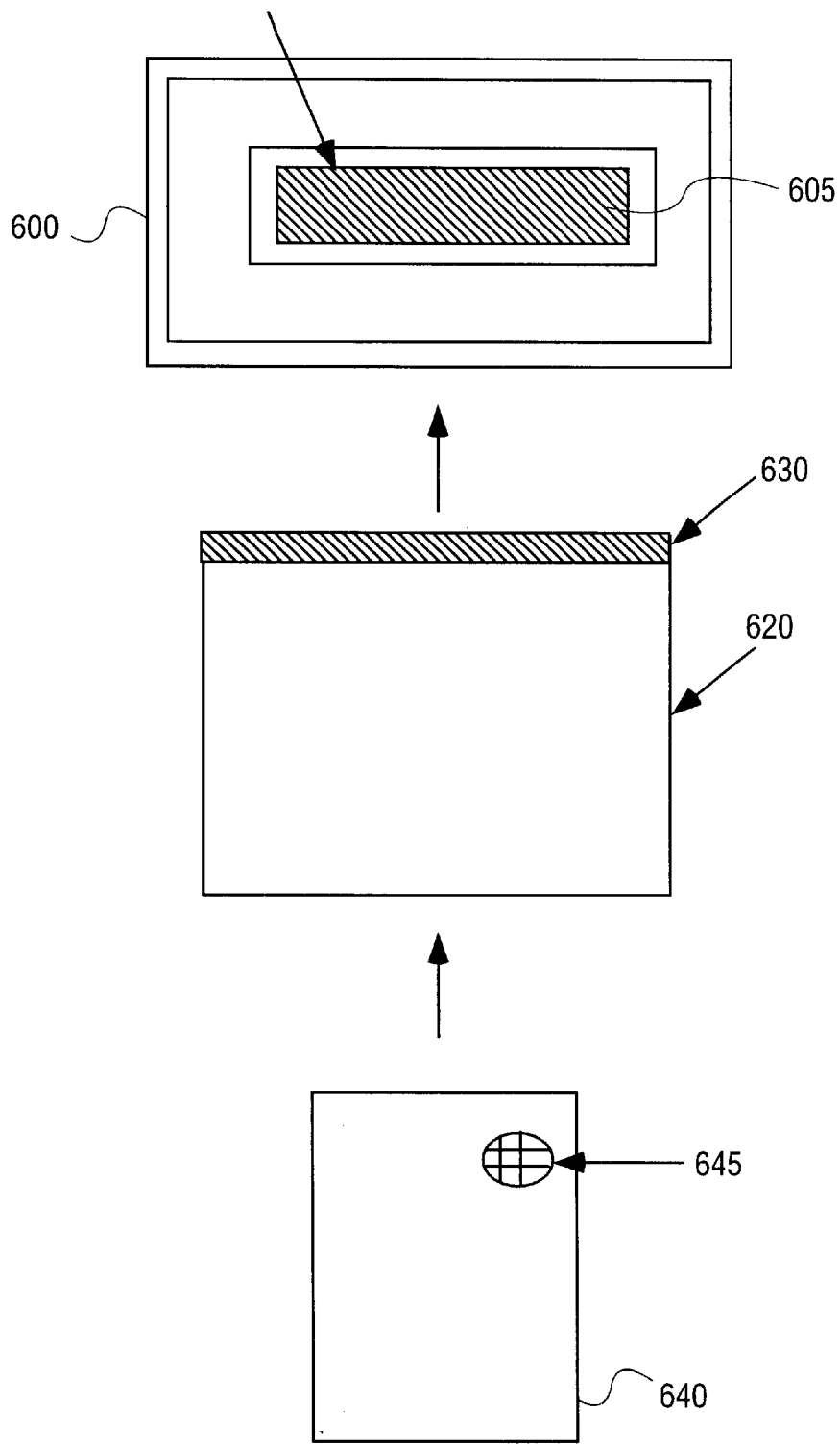
FIG. 6 is a PCMCIA Type 2 slot with an intelligent host.

FIG. 6 is an alternative embodiment of a dual-card CA module. In this embodiment, module 600 has a PCMCIA type 2 slot 605 with an intelligent host. Module 600 has a PCMCIA connector towards the rear of slot 610. If a PCMCIA card is inserted into the slot in the host CA module, the PCMCIA will make an electrical connection with the host through the PCMCIA connector. The scrambled transport stream is then sent in parallel from the host CA module to the PCMCIA card. The PCMCIA card descrambles the signal, and outputs the descrambled signal the host CA module.

A smart card adapter 620 with PCMCIA connector 630 is inserted into the slot of module 600. The PCMCIA connector 630 joins with the PCMCIA connector in the back of the module 600. The NRSS-A smart card 640 goes inside adapter 620. The ISO contacts 645 of smart card 640 are read by the adapter 620 and are routed to the appropriate pins of the PCMCIA connector.

Figure 7:
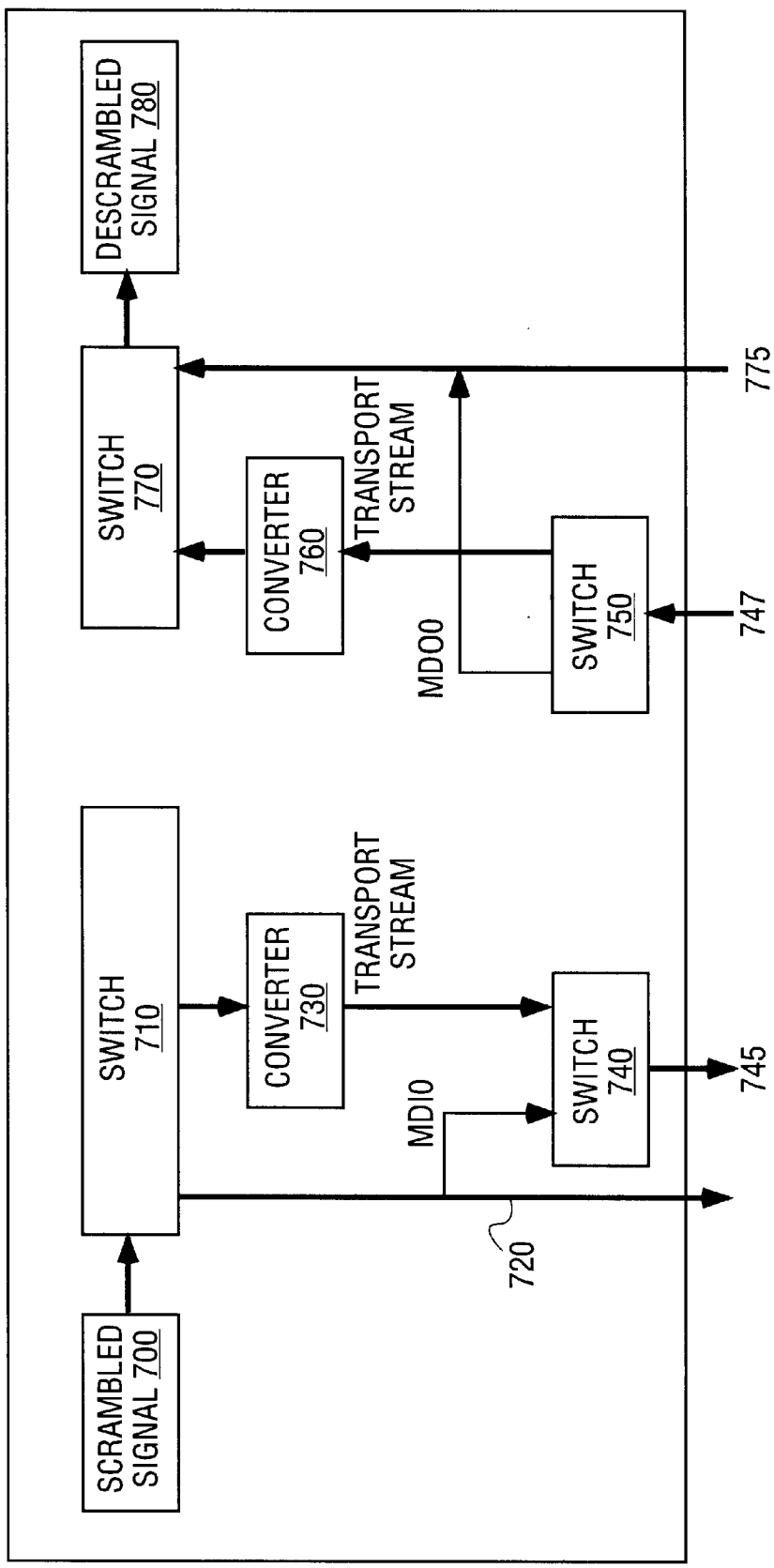
FIG. 7 is a module that uses the MDO0/MDI0 pins to send a serial stream to SC.

FIG. 7 shows the MDO0/MDI0 signals used to send a serial stream to and from the smart card for this embodiment. Switch 710 receives the scrambled transport stream and outputs the stream in parallel to a PCMCIA card through parallel connection 720. The PCMCIA card descrambles the signal and returns the descrambled signal to switch 770 through parallel connection 775.

Alternatively, if an adapter is inserted into the slot of the CA module, switch 710 sends the stream to converter 730, where the stream is converted from a parallel signal to a serial signal. The serial signal is then sent to switch 740 and output through the MDI0 pin 745 to the adapter. The adapter sends the signal to the smart card, where it is descrambled. The smart card sends the descrambled signal back to the adapter, and the adapter sends the signal to switch 750 through MDO0 pin 747. Converter 760 receives and converts the descrambled serial signal to a parallel signal. Switch 770 receives the parallel signal from switch 760.

Figure 8:
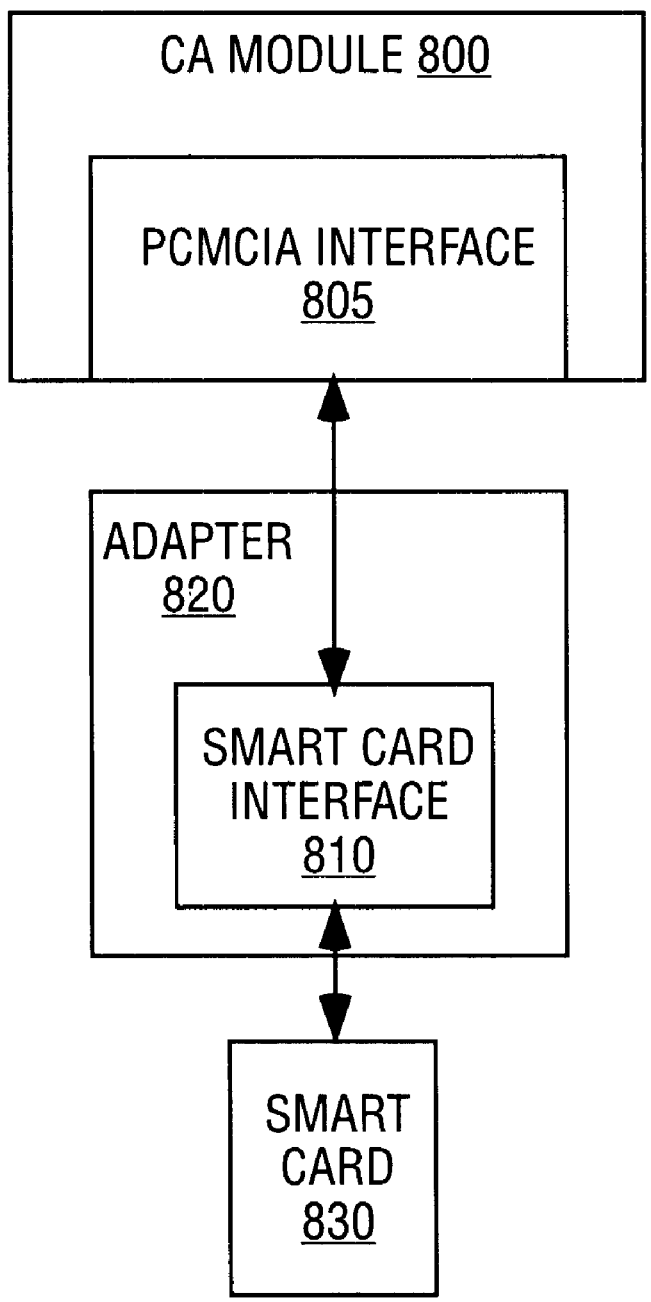
FIG. 8 is an adapter including an interface that uses the MDO0/MDI0 pins to send and receive a serial stream to and from the smart card, and to send and receive a parallel stream to and from the host CA module.

FIG. 8 shows an alternative embodiment, where the smart card interface 810 is located in the adapter, thus eliminating the need for one in the host CA module. The interface 810 receives a parallel signal from the CA module, and converts it to a serial signal. Then, the interface sends the serial signal to the smart card, where the signal is descrambled. The descrambled serial signal is received by the interface 810, converted to parallel, and sent to the CA module.

In an alternative embodiment, both the NRSS-A and the NRSS-B protocols are combined into one protocol, which supports both types of form factors. There are several reasons to support the enhanced capabilities of the POD module for cable. This combined form factor allows processing of Out-of-Band (OOB) signals and a second CPU interface. The OOB signals can permit distribution of system information (SI) and EMMs without having to place In-Band in each multiplex of a cable system. The second CPU interface permits passing of information from the OOB to the host.

There are also advantages in supporting the low cost form factor of NRSS-A. There are many types of terrestrial decoders, i.e. radios, data receivers, which do not require the OOB processing of POD (NRSS-B). The problem for a CA manufacturer to support two types of protocols may be difficult and unnecessary. The protocols can be combined into a single more functional protocol of NRSS-A. In fact, very few changes are required when both the PCMCIA and smart card NRSS form factors both used the NRSS-B protocol. The merging of the two protocols allows for greater acceptance of both form factors. This is especially true when the NRSS-B POD interface accommodates an NRSS-A module.

What is claimed is:

1. An apparatus comprising an adapter, said adapter comprising:
   a slot that receives a smart card;
   a connector;
   a passive router that routes signals from the smart card to the connector;
   a first converter to convert a scrambled data stream in a parallel format into a serial signal for output via the connector to the adapter; and
   a second converter to receive a descrambled serial data stream from the adapter through the connector and to convert the descrambled serial data stream into a descrambled parallel data stream.

2. The apparatus of claim 1 further comprising a host conditional access module coupled to the adapter through the connector.

3. The apparatus of claim 2 wherein the host conditional access module further comprises an outgoing converter to convert an outgoing signal from a first format to a second format.

4. The apparatus of claim 3, wherein the first format of the signal is parallel, and the second format of the signal is serial.

5. The apparatus of claim 2 wherein the host conditional access module further comprises an incoming converter to convert an incoming signal from a second format to a first format.

6. The apparatus of claim 5 wherein the second format is serial and the first format is parallel.

7. An adapter comprising:
a slot to receive a smart card;
a connector to connect to a conditional access module;
a first converter to convert a scrambled data stream in a parallel format from the conditional access module into a serial signal for output to the smart card; and
a second converter to receive a descrambled serial data stream from the smart card and to convert the descrambled serial data stream into a descrambled parallel data stream for output to the conditional access module.

8. A connector comprising:
a PCMCIA connector to form a connection between a PCMCIA card and a conditional access module being further adapted with a first converter to convert a scrambled data stream in a parallel format into a serial signal for output over a first selected pin of the PCMCIA connector and a second converter to receive a descrambled serial data stream from a smart card and to convert the descrambled serial data stream into a descrambled parallel data stream for output to the conditional access module; and
a smart card reader to form a connection between the smart card and the conditional access module.

9. The converter of claim 8 further comprising a smart card slot to hold the smart card.

10. The converter of claim 9, further comprising a plastic insert that can be inserted into the smart card slot so that the connection between the smart card and the smart card reader is maintained.

11. An apparatus comprising:
a first slot;
a PCMCIA connector positioned substantially at a rear of the first slot;
an adapter configured for insertion into the first slot, the adapter comprises
a second slot configured to receive a smart card,
a connector positioned at the adapter for coupling to the PCMCIA connector, and
a passive router that routes signals from the smart card to the connector;
a first converter to convert a scrambled data stream in a parallel format into a serial signal for output over a first selected pin of the PCMCIA connector to the adapter; and a second converter to receive a descrambled serial data stream from the adapter over a second selected pin of the PCMCIA connector and to convert the descrambled serial data stream into a descrambled parallel data stream.

12. The apparatus of claim 11, wherein the passive router of the adapter establishes an electrical connection with ISO contacts of the smart card and routes information from the smart card to the connector.

13. The apparatus of claim 11, wherein the adapter is separate and removable from the first slot.

14. The apparatus of claim 11, wherein the first slot is a PCMCIA Type 2 slot.

15. The apparatus of claim 11 further comprising:
a first switch coupled to the first converter to receive the scrambled data stream and to provide the scrambled data stream to the first converter when the adapter is inserted into the first slot and coupled to the PCMCIA connector.

16. The apparatus of claim 15 further comprising a second switch coupled to the first switch and the first converter, the first switch to provide the scrambled data stream, excluding data destined for the first selected pin of the PCMCIA connector, directly to the PCMCIA connector if a PCMCIA card is inserted into the slot and is coupled to the PCMCIA connector in lieu of the adapter and the smart card, the second switch selectively routing the data destined for the first selected pin therethrough in lieu of the serial signal.

17. The apparatus of claim 15, wherein the first switch to provide the scrambled data stream directly to the PCMCIA connector if a PCMCIA card is inserted into the slot and is coupled to the PCMCIA connector in lieu of the adapter and the smart card.

18. The apparatus of claim 15 further comprising:
a second switch coupled to the second converter to receive either the descrambled serial data stream from the second converter when the adapter is inserted into the first slot and coupled to the PCMCIA connector or the descrambled serial data stream directly from the PCMCIA connector when a PCMCIA card is inserted into the first slot.

19. An adapter adapted for insertion into a card slot associated with a conditional access module, comprising:
a slot located at a first end, the slot being adapted to receive a smart card for establishing an electrical connection with the inserted smart card;
a converter to convert a serial signal from the smart card to a parallel signal;
a connector located at a second end of the adapter, the connector to connect the smart card to the conditional access module; and
a smart card interface to convert an incoming parallel signal from the conditional access module into a serial signal corresponding to the incoming parallel signal.

20. The adapter of claim 19, wherein the connector is a PCMCIA connector.

21. The adapter of claim 20, wherein the smart card supporting a NRSS-A communication protocol.

22. The adapter of claim 19, wherein the electrical connection is achieved via at least one ISO contact of the inserted smart card.

* * * * *